United States Patent
Zieba et al.

[11] Patent Number: 6,067,188
[45] Date of Patent: *May 23, 2000

[54] APPARATUS FOR PROVIDING A NEAR-IR EMISSION SUPPRESSING/COLOR ENHANCING ACCESSORY DEVICE FOR PLASMA DISPLAY PANELS

[75] Inventors: Jaroslaw Zieba, Santa Rosa, Calif.; James W. Seeser, Columbia, Mo.; Michael J. Cumbo, Santa Rosa, Calif.; William T. Beauchamp, Santa Rosa, Calif.; Robert T. Scanlon, Santa Rosa, Calif.; Curtis R. Hruska, Santa Rosa, Calif.

[73] Assignee: Optical Coating Laboratory, Inc., Santa Rosa, Calif.

[ * ] Notice: This patent is subject to a terminal disclaimer.

[21] Appl. No.: 09/311,510

[22] Filed: May 13, 1999

Related U.S. Application Data

[63] Continuation of application No. 09/002,456, Jan. 2, 1998, which is a continuation-in-part of application No. 08/774,058, Dec. 23, 1996, Pat. No. 5,811,923.

[51] Int. Cl.[7] .............................. G02B 17/00; H10J 17/04; H10J 17/49
[52] U.S. Cl. ......................... 359/350; 359/580; 313/479; 313/478; 313/112; 348/819
[58] Field of Search .................................. 359/350, 361, 359/578; 313/478, 479, 466, 446, 313; 348/819, 835

[56] References Cited

U.S. PATENT DOCUMENTS

| | | | |
|---|---|---|---|
| 3,873,868 | 3/1975 | Robinder | 313/112 |
| 4,839,736 | 6/1989 | Sugihara et al. | 358/253 |
| 4,910,090 | 3/1990 | Kuhlman et al. | 428/469 |
| 5,004,490 | 4/1991 | Brown | 60/60.52 |
| 5,147,694 | 9/1992 | Clarke | 428/34 |
| 5,325,579 | 7/1994 | Baier | 29/462 |
| 5,811,923 | 9/1998 | Zieba et al. | 313/479 |

FOREIGN PATENT DOCUMENTS

| | | |
|---|---|---|
| 7-178866 | 7/1995 | Japan . |
| WO98/59335 | 12/1998 | WIPO . |

*Primary Examiner*—Audrey Chang
*Attorney, Agent, or Firm*—Workman, Nydegger & Seeley

[57] ABSTRACT

The present invention is directed to apparatus for enhancing the performance of visual display units which utilize plasma display panels. More specifically, the present invention provides apparatus for providing an electrical noise suppressing/chromaticity enhancing accessory device for positioning in front of the viewing surface of a plasma display panel (PDP). In its most basic embodiment, the accessory device of the present invention comprises an optically selective coating providing high photopic transmittance, continuous high electrical conductivity for RFI shielding, and reflectivity specifically within the near-IR region. It also preferably includes a multiple-dye coating for selectively absorbing IR energy emissions and selectively balancing the chromaticity of the PDP display and a plastic substrate layer to provide impact resistance. The combination of the IR absorption and color-correction due to the multiple-dye coating and the near-IR reflectivity due to the optically selective coating surprisingly results in very good suppression of IR emissions from the PDP within the spectral range of about 800 to about 2500 nm and chromaticity enhancement while simultaneously maintaining good photopic transmittance.

26 Claims, 1 Drawing Sheet

APPARATUS FOR PROVIDING A NEAR-IR EMISSION SUPPRESSING/COLOR ENHANCING ACCESSORY DEVICE FOR PLASMA DISPLAY PANELS

RELATED U.S. APPLICATIONS

The present application is a continuation application of U.S. Ser. No. 09/002,456, filed on Jan. 2, 1998, which is a continuation-in-part application of U.S. Ser. No. 08/774,058, filed Dec. 23, 1996, now U.S. Pat. No. 5,811,923, commonly assigned to the assignee of the present application, which application is hereby expressly incorporated herein by reference.

BACKGROUND OF THE INVENTION

1. The Field of the Invention

The present invention is directed to methods and apparatus for enhancing the performance of visual display units which utilize plasma display panels. More specifically, the present invention provides methods and apparatus for providing an accessory device for positioning in front of the viewing surface of a plasma display panel that suppresses near-IR emissions in the range of about 800 to about 2500 nm while simultaneously providing good photopic transmittance and enhanced color and display readability.

2. The Relevant Technology

Many types of visual display units (VDUs) are known. A very useful type of flat panel display for VDUs utilizes a plasma display panel (PDP) to generate the visual image. PDPs consist of individual cells at the intersection of typically orthogonal electrically communicating address lines. The individual cells electrically communicate with a gas plasma. In a typical PDP, the conducting electrodes are patterned onto opposed surfaces of a front and a rear substrate material. The address electrodes are typically patterned onto the front-facing surface of the rear substrate material and the sustain and bus electrodes are patterned onto the opposed, i.e., rear-facing, surface of the front substrate material. The substrate material is usually glass. Phosphor material(s), similar to that used in fluorescent lamps, are deposited onto the electrode-patterned, front-facing surface of the rear substrate. The phosphor materials can be individually chosen such that they emit only red, green, or blue light thus providing the ability to produce a colored image. Electrically isolating separators are positioned between the different phosphor materials to form separate phosphor channels. The gas plasma is contained between the phosphor materials deposited on the rear substrate and the opposed surface of the front substrate. In this configuration, when a sustaining voltage is applied to the sustain electrodes, the fringing fields from these electrodes reach into the gas plasma and create a discharge resulting in the emission of ultraviolet (UV) light from the gas plasma. The UV emission, in turn, excites the adjacent phosphor material resulting in emission of visible light which is transmitted through the electrode-patterned front substrate and, thus, to the eye of the VDU user.

A problem with PDPs is low luminous efficiency, a measure of the display output light luminance for a given input power. Although typical fluorescent lamps emit about 80 lumens of light for every watt of electrical power supplied, current PDPs emit only about 1–4 lumens per watt. In order to achieve sufficient brightness, relatively high power input is necessary. The high power input, however, results in the emission of significant electrical noise including, specifically, radio frequency interference (RFI) due to the plasma discharges and significant infrared (IR) energy due to the plasma discharges and the heat generated within the panel. The RFI and IR emissions may cause interference with other electronic equipment in the near vicinity of the PDP. In particular, the IR radiation can interfere with remote control devices which typically operate at wavelengths in the near-IR range. Thus, there is a need to reduce the emission of radio noise and IR energy from PDPs.

Another problem with PDPs is that the inherent spectral, i.e., color, properties often interfere with good display readability. Various PDPs manufactured by assorted manufacturers comprise different phosphor materials and differing configurations of the components such that the spectral properties of the PDPs differ somewhat. The use of color filters to compensate for the inherent spectral properties and permit clear and readable color images is well known. In particular, depending on the inherent spectral properties, different PDPs may be chromaticity-enhanced with various colors, i.e., tinges, used as a filter. For example, one manufacturer may desire a device having a purple tinge for color correction while another may desire a blue- or green-tinged device for color correction of their PDP.

Various optical coatings and dyed materials are known that can reduce radio noise and IR emissions as well as provide color correction for PDPs. In some cases, however, these optical coatings and dyed materials are not compatible with the production and assembly processes used for PDPs. In addition, many of these optical coatings and dyed materials, especially when provided on an outer, or otherwise environmentally exposed, surface of a PDP, suffer from low durability. Another problem is that the various optical coatings and dyed materials may cause decreases in the photopic transmittance of the PDP which worsens the readability of the display.

It would be an advance to provide methods and apparatus for providing an accessory device for suppressing electrical noise emissions, specifically RFI and near-infrared radiation, and for enhancing the chromaticity of the display while, simultaneously, maintaining good photopic transmittance. It would be a further advance to provide methods and apparatus for providing electrical noise suppressing/chromaticity enhancing accessory devices for PDPs that are cost-effective and highly durable.

SUMMARY AND OBJECTS OF THE INVENTION

It is an object of the present invention to provide methods and apparatus for providing accessory devices for enhancing the performance of visual display units (VDUs) which utilize plasma display panels (PDPs).

It is a further object of the present invention to provide methods and apparatus for providing accessory devices for suppressing the electrical noise emissions and, specifically, radio frequency interference (RFI), from PDPs.

Another object of the present invention is to provide methods and apparatus for providing accessory devices for suppressing electrical noise in the form of emissions of infrared (IR) energy and, in particular, near-IR energy (from about 800 to about 2500 nm), from PDPs.

It is also an object of the present invention to provide methods and apparatus for providing accessory devices for compensating for the inherent spectral properties of a PDP and thereby enhance the chromaticity of the display.

Yet another object of the present invention is to provide methods and apparatus for providing accessory devices for suppressing the electrical noise emissions, both RFI and IR energy, and enhancing the chromaticity of the display while simultaneously maintaining good transmissivity of the display image.

Still another object of the present invention is to provide methods and apparatus for providing electrical noise suppressing/chromaticity enhancing accessory devices for PDPs that are cost-effective and highly durable.

These and other objects and features of the present invention will become more fully apparent from the following description and appended claims, or may be learned by the practice of the invention as set forth hereinafter.

In accord with the present invention, it has been discovered that an accessory device for positioning in front of the viewing surface of a plasma display panel can provide optical enhancement and electrical noise suppression. The accessory device may be provided with attachment means for securing the device to the surface of the visual display unit in a position in front of the viewing surface of the PDP or may be designed to be free-hanging, i.e., suspended, or otherwise positioned in front of the viewing surface of the PDP. The accessory device of the present invention is manufactured separately from the PDP and, thus, concerns related to incorporating only materials that can withstand the processes related to PDP production and assembly are eliminated.

In its most basic embodiment, the accessory device of the present invention comprises a first and a second rigid substrate laminated together by a laminating layer; an optically selective coating providing high photopic transmittance, continuous high electrical conductivity for RFI shielding, and reflectivity specifically within the near-IR region that is mechanically protected by being sandwiched between one rigid substrate and the laminating layer; and, a multiple-dye coating for selectively absorbing IR energy emissions and selectively balancing the chromaticity of the PDP display. The combination of the IR absorption and color-correction due to the multiple-dye coating and the near-IR reflectivity due to the optically selective coating surprisingly results in very good suppression of IR emissions from the PDP within the spectral range of about 800 to about 2500 nm and chromaticity enhancement while simultaneously maintaining good photopic transmittance.

As used herein, the term "coating" refers to one or more layers of different materials deposited on, or incorporated within, a substrate or a substrate already having one or more coatings deposited thereon or incorporated therein. A coating performs a specific function within the multilayered accessory device design. For example, the optically selective coating provides high photopic transmittance, continuous high electrical conductivity for RFI shielding, and reflectivity specifically within the near-IR region. The optically selective coating, when electrically grounded, provides suppression of RFI emissions from the PDP. This coating may be deposited onto a coated or uncoated surface of at least one rigid substrate within the accessory device. The multiple-dye coating provides IR-absorbing and color-balancing properties. This multiple-dye coating is preferably incorporated within the polymeric laminating layer but may, alternatively or additionally, be incorporated within another polymer material serving as one or both of the rigid substrate layers within the design. The device of the present invention preferably also incorporates at least one antireflective coating to reduce reflectance from the accessory device.

In a preferred embodiment, the multiple-dye coating constitutes a formulation of different IR-absorbing and color-balancing dyes introduced into a matrix material that will serve as laminating material between substrate layers in the device. Suitable matrix materials are polymers that are chemically compatible with the selected dyes such that highly uniform dye distribution is achieved following dissolution of the dyes into the polymer and extrusion of the mixture, i.e., the dye-containing polymer, into a laminating foil. A preferred matrix material is ethylene vinyl acetate (EVA), a co-polymer material that does not chemically react with the selected IR and color-balancing dyes and permits the dyes to dissolve therein such that a uniformly distributed dyed co-polymer product can be extruded to produce a multiple-dye containing laminating foil. In addition, the dyed EVA laminating foil can advantageously be laminated with a fast, low-pressure lamination process that does not detrimentally impact the other substrates and optical coatings within the accessory device.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
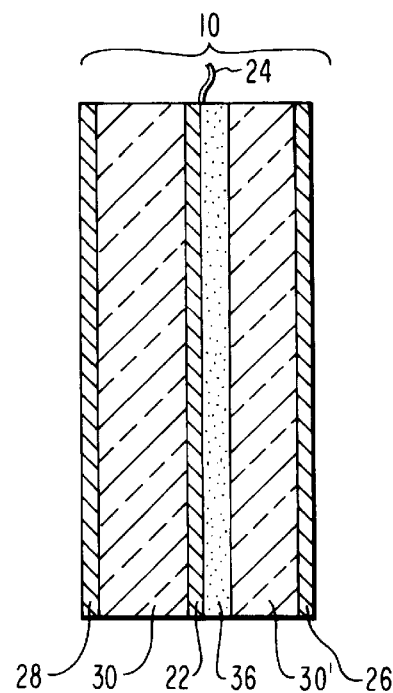
FIG. 1 is a cross-section view of a preferred embodiment of an accessory device for positioning in front of the viewing surface of a plasma display panel in accord with the present invention.

A very useful type of flat panel display for visual display units is a plasma display panel (PDP). PDPs utilize electrical signals to induce the emission of ultraviolet (UV) energy from a gas plasma. The UV emission, in turn, induces the emission of visible light from phosphor materials located within the panel. A problem with PDPs is low luminous efficiency, a measure of the display output light luminance for a given input power. In order to achieve sufficient display brightness, relatively high power input is necessary. Because of the low luminous efficiency, the power input must remain relatively high to maintain a readable display image. Currently available PDPs are typically operated at essentially the highest practical power input.

Plasma discharges within the PDP, particularly at the required high power input, result in the emission of significant electrical noise in the form of radio frequency interference (RFI). The plasma discharges also result in emission of significant infrared (IR) energy from PDPs. As used herein, the term "electrical noise" or "noise" is used inclusively to refer to, in general, either or both RFI and IR emissions from PDPs. The RFI and IR radiation can interfere with other electronic equipment in the vicinity of the PDP. In particular, the IR radiation interferes with remote control devices which typically operate at wavelengths in the near-IR range.

In view of the above, there is a need to reduce the emission of RFI from PDPs. There is a further need to reduce the emission of IR energy from PDPs and, in particular, to block near-IR radiation. In accord with the present invention, it has been discovered that an accessory device for positioning in front of the viewing surface of a plasma display panel can provide optical enhancement and electrical noise suppression. The accessory device may be provided with attachment means for securing the device to the surface of the visual display unit in a position in front of the viewing surface of the PDP or may be designed to be free-hanging, i.e., suspended, or otherwise positioned in front of the viewing surface of the PDP.

The accessory device of the present invention is manufactured separately from the PDP and, thus, concerns related to incorporating only materials that can withstand the processes related to PDP production and assembly are eliminated. In particular, the manufacture of PDPs generally requires that the components be assembled and then subjected to a frit operation to seal the panel. The frit operation includes baking the panel at temperatures of about 500° C. for about 30 minutes. All material and compositions used within the panel must be able to withstand these processing conditions. This requirement limits the available materials and compositions which can be used within a PDP. The device of the present invention advantageously is manufactured separately from the PDP. In addition, because the device is not exposed to the frit operation used to seal the panel, the device provides an additional means to effect the performance of the underlying PDP without the constraint of using only materials and compositions which can tolerate the frit operation.

PDPs manufactured by various manufacturers comprise different phosphor materials and differing configurations of the components such that the spectral properties of the PDPs vary somewhat. The use of color filters to compensate for the inherent spectral properties and permit clear and readable color images is well known. In particular, depending on the inherent spectral properties, different PDPs may be enhanced with various colors, i.e., tinges, used as a filter. For example, one manufacturer may desire a device having a purple tinge for color correction while another may desire a blue- or green-tinged device for color correction of their PDP. Color correction is advantageously incorporated into the device of the present invention.

In its most basic embodiment, the accessory device of the present invention comprises a first and a second rigid substrate laminated together by a laminating layer; an optically selective coating providing high photopic transmittance, continuous high electrical conductivity for RFI shielding, and reflectivity specifically within the near-IR region that is mechanically protected by being sandwiched between one rigid substrate and the laminating layer; and, a multiple-dye coating for selectively absorbing IR energy emissions and selectively balancing the chromaticity of the PDP display. The laminating layer provides both mechanical integrity and optical contact between the two rigid substrate elements. The combination of the IR absorption and color-correction due to the multiple-dye coating and the near-IR reflectivity due to the optically selective coating surprisingly results in very good suppression of IR emissions from the PDP within the spectral range of about 800 to about 2500 nm and chromaticity enhancement while simultaneously maintaining good photopic transmittance.

As used herein, the term "coating" refers to one or more layers of different materials deposited on, or incorporated within, a substrate or a substrate already having one or more coatings deposited thereon or incorporated therein. A coating performs a specific function within the multilayered accessory device design. For example, the optically selective coating provides high photopic transmittance, continuous high electrical conductivity for RFI shielding, and reflectivity specifically within the near-IR region. The optically selective coating, when electrically grounded, provides suppression of RFI emissions from the PDP. This coating may be deposited onto a coated or uncoated surface of at least one rigid substrate within the accessory device. The multiple-dye coating provides IR-absorbing and color-balancing properties. This multiple-dye coating is preferably incorporated within the polymeric laminating layer but may, alternatively or additionally, be incorporated within another polymer material serving as one or both of the rigid substrate layers within the design. The device of the present invention preferably also incorporates at least one antireflective coating to reduce reflectance from the accessory device. As described below, the device of the present invention preferably also incorporates at least one antireflective coating to reduce reflectance from the accessory device.

In a preferred embodiment, the multiple-dye coating constitutes a formulation of different IR-absorbing and color-balancing dyes introduced into a matrix material that will serve as laminating material between substrate layers in the device. Suitable matrix materials include various polymers that are chemically compatible with the selected dyes such that highly uniform dye distribution is achieved following dissolution of the dyes into the polymer and extrusion of the mixture, i.e., the dye-containing polymer, into a laminating foil. A preferred matrix material is ethylene vinyl acetate (EVA), a co-polymer material that does not chemically react with the selected IR and color-balancing dyes and permits the dyes to dissolve therein such that a uniformly distributed dyed co-polymer product can be extruded to produce a multiple-dye containing laminating foil. In addition, the dyed EVA laminating foil can advantageously be laminated with a fast, low-pressure lamination process that does not detrimentally impact the other substrates and optical coatings within the accessory device.

Other examples of polymeric laminating materials suitable for use in the present invention include the following: polyurethane PE-193 or PE-399 available from Morton, International (Arlington Heights, Ill.); polyvinyl butyrate (PVB) available from various manufacturers; and silicone PSA available from Adhesive Research (Glen Rock, Pa.). As mentioned above, the multiple-dye coating may be incorporated, either alternatively or additionally, into a polymer material serving as one or both of the rigid substrates. In this case, suitable polymers are known in the art and include, for example, polycarbonate and acrylic materials.

Exemplary IR-absorbing dye materials which can be incorporated into plastic substrate layers and/or polymeric adhesive layers, which are photochemically stable under ambient light conditions, and which absorb light within the near-IR region of the spectrum include such organic metal complexes as V63 and V102 (products of Epolin Inc., Newark, N.J.). Maximum absorption for V63 dye occurs at about 854 nm and for V102 at about 802 nm. An exemplary color-balancing dye suitable for use in the present invention is CB Blue (also a product of Epolin, Inc.) which provides a blue compensating tinge to the PDP display.

It has been surprisingly discovered that mixtures of all three of the above-recited dyes, having various concentration ratios (by weight) can be formulated to meet the various spectral, i.e., color-balancing, demands for a particular PDP while simultaneously providing excellent suppression of a range of near-IR wavelengths from about 800 to about 2500 nm (in combination with the optically selective coating). All three of these dyes may be dissolved in EVA to produce an extruded laminating foil uniformly "doped," i.e., having the dye mixture distributed therethrough, with a precisely formulated dye mixture to meet the spectral and color requirements of a selected PDP device. The particular choice of dyes and their concentrations is determined by the final thickness of the extruded EVA foil and the requirements for photopic transmittance and the color coordinates of the PDP display.

Because of the plasma discharges, emission of RFI from PDPs may be much greater than from other types of flat panel displays, e.g., cathode ray tube (CRT) displays or liquid crystal displays (LCDs). As described above, the device of the present invention comprises an optically selective coating to provide good photopic transmittance, continuous high electrical conductivity for RFI shielding, and reflectivity specifically within the near-IR region. Unlike conventional RFI shielding layers, the optically selective coating of the present invention provides a continuous electrically conducting layer. In particular, rather than being patterned with an electrically conducting material, the entire optically selective layer comprises an electrically conducting material such that the optically selective layer is continuously electrically conducting. The optically selective coating must be electrically grounded to suppress RFI. Thus, the optically selective coating is provided with means for making an electrical connection to a suitable component of the PDP or the visual display unit itself to thereby electrically ground the optically selective coating.

The electrical conductivity of a coating is rarely specified explicitly. Rather, the sheet resistivity is specified, usually in terms of ohms per square, since with this form, it is not necessary to specify the thickness of the coating. The sheet resistivity of a coating varies with the thickness and the intrinsic electrical resistivity of the selected material. The specific relationship is described by the formula $R_s=\rho/t$, where $R_s$ represents sheet resistance in units of ohms per square, $\rho$ is intrinsic resistivity in units of ohm·cm, and t is film thickness. Electrical resistivity is a function of the specific material used as well as the particular deposition method and process conditions employed. Electrical resistivity of semiconductor materials may have a significant temperature coefficient as well.

Sheet resistivity is an inverse measure of conductivity, i.e., the lower the sheet resistivity, the higher the conductivity. Typical sheet resistivity for coatings designed for use with other types of flat panel displays are about 100 ohms per square. For PDPs, however, the coatings require a sheet resistivity of less than about 10 ohms per square and, preferably, less than about 5 ohms per square, to provide the conductivity needed to block the emission of RFI.

In addition to continuous high electrical conductivity and good photopic transmittance, the optically selective coating of the present invention reflects IR energy and, particularly, near-IR energy. Because PDPs suffer from low luminous efficiency, good photopic transmittance through the viewing surface of the PDP must be maintained to avoid degrading the readability of the display.

It has been surprisingly discovered that the device of the present invention achieves excellent suppression of IR emissions and, particularly, of near-IR emissions in the range of about 800 to about 2500 nm, with the combination of the multiple-dye coating and the optically selective coating and also enhances chromaticity of the PDP display while maintaining good photopic transmittance through the viewing surface of the PDP. In contrast, if one or more optically selective coatings alone or one or more multiple-dye coatings alone were used, rather than the combination herein disclosed, a similar suppression of IR emissions could be obtained only at the cost of significantly increasing absorption in the visible spectrum, i.e., decreasing photopic transmittance.

Suitable optically selective coatings having good photopic transmittance, continuous high electrical conductivity, and near-IR reflectivity are commercially available. For example, coating products known as LoE® and LoE²® are available, precoated onto glass substrates, from Cardinal Glass, (Minnetonka, Minn.). Similar coatings are also available on plastic substrates. The LoE and $LoE^2$ coating products include dielectric materials and metallic materials in various alternating layers over a substrate. Examples of suitable dielectric materials include metal oxides such as zinc oxide, titanium dioxide, and the like. Examples of suitable metallic materials include silver, nickel, gold, copper, mixtures thereof, and the like.

Optical performance of visual display units is also affected by reflectance introduced at the interfaces of different materials within the PDP, within an accessory device positioned in front of the PDP, and between any such accessory device and the PDP. Reflectance occurs at the interfaces of materials having differing indices of refraction, i.e., where there is an index discontinuity. Accordingly, the accessory device of the present invention preferably incorporates antireflective coatings to reduce reflectance. For example, antireflective coating can be applied to the front (viewing) surface of the accessory device. Preferably, another antireflective coating is applied to the rear surface, i.e., PDP-facing, surface of the accessory device. It is also preferred to deposit an electrically conducting layer, which may also function as the antireflective coating, on the front viewing surface of the device to provide static discharge. Suitable antireflective coatings and antireflective coatings which are electrically conductive are known in the art. For example, an exemplary antireflective coating is HEA® coating and an exemplary conducting coating is CHEA® coating (both coatings are products of Optical Coating Laboratories, Inc., Santa Rosa, Calif.).

As shown in the cross section view of FIG. 1, a preferred embodiment of the present invention provides an accessory device 10 for positioning in front of the viewing surface of a plasma display panel (not shown). It will be appreciated that the materials and compositions comprising the device not shown to scale or in proportional sizes in the Figures herein. In addition, the use of the terms "first" and "second," etc. to refer to substrate layers is not intended to necessarily indicate position with respect to either the front viewing surface of the device or the rear plasma display panel-facing surface of the device.

The electrical noise suppressing/chromaticity enhancing accessory device 10 for positioning in front of the viewing surface of a PDP comprises a first rigid substrate 30 having a front surface that will face a viewer of the PDP display and a rear surface that will face the PDP display and a second rigid substrate 30' also having a front surface and a rear surface. The two rigid substrates are secured with a laminating layer 36 positioned therebetween. As described above, the laminating layer provides mechanical integrity and optical contact between the two rigid substrate elements.

An optically selective coating 22 is deposited on the front surface of the first rigid substrate 30. As described above, the optically selective coating is required to have good photopic transmittance, continuous high electrical conductivity, and reflectivity in the near-IR range and consists, for example, of a LoE²® coating on a glass or plastic substrate. The optically selective coating must be provided with means for electrical grounding. For example, a bus bar (not shown) may be formed on one surface of this layer and provided with an electrical connector 24 by conventional methods. The bus bar may, for example, be formed from electrically conducting copper-based adhesive tape placed in contact with the peripheral edges of the continuously electrically conductive optically selective coating 22 and an extending tape portion may be provided with an electrical connector 24 for making an electrical grounding connection. Because the optically selective coating 22 is positioned between the two rigid substrates, the coating is advantageously protected from environmental exposure as well as mechanical impacts.

A multiple-dye coating is preferably incorporated into the accessory device 10 by being uniformly distributed throughout laminating layer 36. As described above, in a preferred embodiment, the multiple-dye coating constitutes a formulation of different IR-absorbing and color-balancing dyes introduced into a matrix material that will serve as laminating material between substrate layers in the device. Suitable matrix materials include various polymers that are chemically compatible with the selected dyes such that highly uniform dye distribution is achieved following dissolution of the dyes into the polymer and extrusion of the mixture, i.e., the dye-containing polymer, into a laminating foil.

As described above, a preferred matrix material is ethylene vinyl acetate (EVA), a co-polymer material that does not chemically react with the selected IR and color-balancing dyes and permits the dyes to dissolve therein such that a uniformly distributed dyed copolymer product can be extruded to produce a multiple-dye containing laminating foil. Also, as described above, the particular choice of dyes and their concentrations is determined by the final thickness of the extruded EVA foil and the requirements for photopic transmittance and the color coordinates of the PDP display. Exemplary IR-absorbing dye materials which can be incorporated into plastic substrate layers and/or polymeric adhesive layers, which are photochemically stable under ambient light conditions, and which absorb light within the near-IR region of the spectrum include the organic metal complex products V63 and V102 (products of Epolin Inc.) and an exemplary color-balancing dye is CB Blue (also a product of Epolin, Inc.). Other suitable dye materials include 5,5'-dichloro-11-diphenylamino-3,3'-diethyl- 10,12-ethylenethiatricarbocyanine perchlorate; 2,4 Di-3-guaiazulenyl-1,3-dihydroxycyclobutenediylium dihydroxide,bis(inner salt); and 1-butyl-2-[2-[3[(1-butyl-6-chlorobenz[cd]indol-2(1H)-ylidiene)ethylidene]-2-chloro-5-methyl-1-cyclohexen-1-yl]ethenyl]-6-chlorobenz[cd] indolium tetrafluoroborate.

Returning to FIG. 1, an antireflective coating 26 is preferably deposited onto the front (viewer-facing) surface the second rigid substrate 30'. This antireflective coating may be electrically conducting and grounded, if desired, to provide means for static discharge on the viewing surface of the accessory device 10. A second antireflective coating 28 is also preferably deposited onto the rear (PDP-facing) surface of the first rigid substrate 30. If desired, additional antireflective coatings may also be incorporated within the accessory device, for example, on the optically selective coating 22 or the rear surface of the second rigid substrate 30'.

Figure 2:
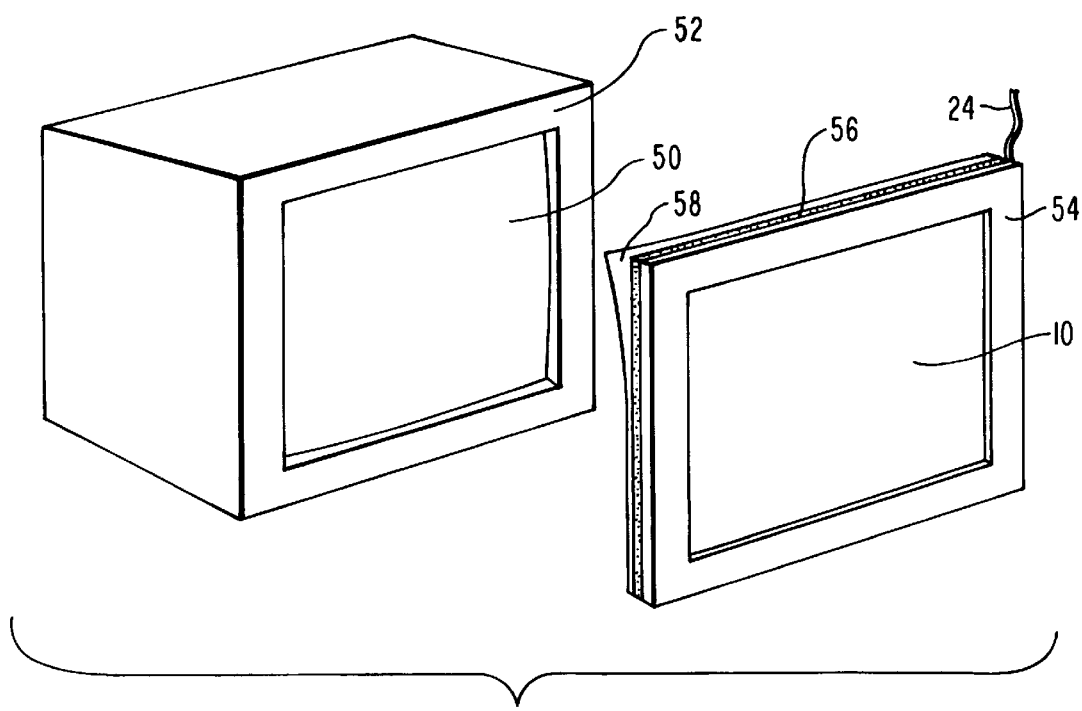
FIG. 2 is a schematic illustration of a preferred embodiment of a device in position to be affixed to the front of a visual display unit in accord with the present invention.

FIG. 2 is a schematic illustration of an electrical noise suppressing/chromaticity enhancing accessory device 10 in accord with the present invention ready for positioning in front of the viewing surface of a plasma display panel 50 within a visual display unit 52. As described above, the accessory device of the present invention may be adapted for attaching, either permanently or removably, to the visual display unit or for hanging or otherwise suspending in front of the visual display unit. The accessory device of the present invention preferably comprises a frame element 54 which may, if desired, be made of metal and may electrically communicate with the optically selective layer within the device. As described above, the optically selective layer within the accessory device is provided with an electrical connector 24 such that the device may be electrically grounded. Depending on the specific design of the visual display unit and the plasma display panel, a suitable connection can be designed for connecting to the electrical connector 24. Various means for securing the device 10 to the front viewing surface of a visual display unit may also preferably be incorporated within the accessory device. For example, as shown in FIG. 2, a pressure-sensitive adhesive layer 56 with a release liner 58 may be applied to the surface of the frame element 54. The release liner may be removed and the frame can be pressed against the visual display unit and secured thereto with the adhesive layer.

EXAMPLE

Preparation of Dyed Laminating Material

A formulation of two different IR-absorbing dyes, V63 and V102 (products of Epolin Inc.), and a color-balancing dye, CB Blue (product of Epolin Inc.), is prepared in the following manner: a 2:1 ratio (by weight) mixture of V102 and V63, respectively, is mixed with CB Blue dye in a ratio of 8:1 (by weight). The combination of dyes is then introduced into ethylene vinyl acetate (EVA) co-polymer in a concentration of 0.02% (by weight) that becomes dissolved and uniformly distributed. The EVA material, doped with the precisely formulated multiple-dye mixture, is then extruded into polymeric foil having a thickness of 12 micrometers.

Preparation of Substrates and Assembly of Accessory Device

Glass having LoE²® coating on one surface and an antireflection coating on the opposite side is cut to the desired size. A thin strip of adhesive conducting copper tape is placed around the periphery of the LoE²® coating and is wrapped around the edges of the cut glass. This tape forms a bus bar for connecting to an electrical connection such that the continuously conducting LoE²® coating layer can be electrically grounded. A correspondingly-sized sheet of the prepared EVA lamination foil is placed on the LoE²® coating and then a correspondingly-sized piece of float glass having an antireflection coating on one surface is placed on the EVA lamination foil with the antireflection coating on the side opposite to the EVA lamination foil. The components are properly aligned and the lamination process is initiated. The lamination process can be effected using various known methods such as autoclave high-temperature lamination, low-pressure lamination, in-line roller lamination, or a combination of these. After the lamination is completed, the environmentally-sensitive LoE²® coating is encapsulated within the accessory device and thereby protected by the EVA and the float glass layers.

The device prepared as described demonstrates the following optical properties: transmittance at 830 nm: 7–12%; transmittance at 880 nm: 5–10%; transmittance at 950 nm: 5–10%; reflectance at front (viewer-facing) surface: 3%;

reflectance at rear (PDP-facing) surface: 2.5%; photopic transmittance: in the range of about 68–70%. It will be appreciated that the particular dyes and mixture ratios as well as the concentration of the multiple-dye coating dissolved within the laminating material and the thickness of the laminating layer can be varied to achieve selected optical properties related to the suppression of near-IR emissions and the color correction functions. The following table gives exemplary approximate average transmittance values for accessory devices prepared as described above using a glass substrate having LoE$^2$® coating on one surface and an antireflection coating on the opposite side and a float glass substrate having an antireflection coating on one surface laminated together with 12 nm thick EVA lamination foil prepared without dye or with varying concentrations of the above-described dye mixture:

TABLE 1

| Conc. of Dye Mixture | 0 | 0.01 | 0.02 | 0.04 |
|---|---|---|---|---|
| % Photopic Transmittance | 78 | 73 | 70 | 63 |
| % Transmittance @ 800 nm | 45 | 25 | 15 | 12 |
| % Transmittance @ 830 nm | 37 | 19 | 10 | 8 |
| % Transmittance @ 880 nm | 25 | 18 | 10 | 6 |
| % Transmittance @ 950 nm | 18 | 15 | 9 | 7 |
| % Transmittance @ 1000 nm | 15 | 15 | 8 | 6 |
| % Transmittance @ 1500 nm | 4 | 4 | 4 | 4 |
| % Transmittance @ 2500 nm | 2 | 2 | 2 | 2 |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A device for positioning in front of the viewing surface of a plasma display panel, said device comprising:
   a) at least one plastic substrate layer to provide impact resistance to said plasma display panel;
   b) an infrared absorber to absorb infrared energy emitted from said plasma display panel;
   c) an optically selective coating having photopic transmittance, continuous electrical conductivity and reflectivity within the near-infrared region; and
   d) a grounding element for electrically grounding said optically selective coating.

2. The device described in claim 1 wherein said optically selective coating is deposited on a surface of said plastic substrate layer.

3. The device described in claim 1 wherein said infrared absorber is a dye material incorporated into said plastic substrate layer.

4. The device described in claim 3 further comprising an antireflective coating layer deposited on said optically selective coating.

5. The device described in claim 4 further comprising a second antireflective coating layer deposited on a surface of said plastic substrate layer.

6. The device described in claim 5 wherein said second antireflective coating layer is electrically conducting.

7. The device described in claim 3 wherein said dye material is selected from the group consisting of 5,5'-dichloro-11-diphenylamino-3,3'-diethyl-10,12-ethylenethiatricarbocyanine perchlorate; 2,4 di-3-guaiazulenyl-1,3-dihydroxycyclobutenediylium dihydroxide,bis(inner salt); and 1-butyl-2-[2-[3[(1-butyl-6-chlorobenz[cd]indol-2(1H)-ylidiene)ethylidene]-2-chloro-5-methyl-1-cyclohexen-1-yl]ethenyl]-6-chlorobenz[cd]indolium tetrafluoroborate.

8. The device described in claim 1, wherein the infrared absorber comprises a layer of a material that absorbs infrared energy.

9. The device described in claim 1, wherein the infrared absorber comprises a plurality of layers of different materials forming a coating that absorbs infrared energy.

10. A device for positioning in front of the viewing surface of a plasma display panel, said device comprising:
    a) a first substrate layer;
    b) a second substrate layer positioned parallel and facing said first substrate layer;
    c) a plastic substrate layer between said first substrate layer and said second substrate layer;
    d) a dye material capable of absorbing infrared energy, said dye material being incorporated into said plastic substrate layer;
    e) an optically selective coating having photopic transmittance, continuous electrical conductivity and reflectivity within the near-infrared region; and
    f) a grounding element for electrically grounding said optically selective coating.

11. The device described in claim 10 wherein said first substrate layer is glass.

12. The device described in claim 11 wherein said second substrate layer is glass.

13. The device described in claim 12 wherein said optically selective coating is deposited on a surface of one of said first glass substrate layer and said second substrate layer, said surface facing an opposing surface of the parallel substrate layer.

14. The device described in claim 13 wherein said dye material has a selected color correcting property.

15. The device described in claim 10 wherein said optically selective coating is deposited on a surface of said plastic substrate layer.

16. The device described in claim 10 wherein said dye material is selected from the group consisting of 5,5'-dichloro-11-diphenylamino-3,3'-diethyl-10,12-ethylenethiatricarbocyanine perchlorate; 2,4 Di-3-guaiazulenyl-1,3-dihydroxycyclobutenediylium dihydroxide,bis(inner salt); and 1-butyl-2-[2-[3[(1-butyl-6-chlorobenz[cd]indol-2(1H)-ylidiene)ethylidene]-2-chloro-5-methyl-1-cyclohexen-1-yl]ethenyl]-6-chlorobenz[cd]indolium tetrafluoroborate.

17. A device for positioning in front of the viewing surface of a plasma display panel, said device comprising:
    a) a glass substrate layer having a front viewing surface and a rear surface;
    b) a plastic substrate layer having a front surface facing said rear surface of said glass substrate and having a rear panel-facing surface for positioning in front of the viewing surface of a plasma display panel;
    c) an adhesive layer between said glass substrate layer and said plastic substrate layer;
    d) a dye material capable of absorbing infrared energy, said dye material being incorporated into said plastic substrate layer;

e) an optically selective coating having photopic transmittance, continuous electrical conductivity and reflectivity within the near-infrared region; and f) a grounding element for electrically grounding said optically selective coating.

18. The device described in claim 17 further comprising a first antireflective coating layer formed on the glass substrate layer.

19. The device described in claim 18 further comprising a second antireflective coating layer formed on the plastic substrate layer.

20. A device for positioning in front of the viewing surface of a plasma display panel, said device comprising:

a) a glass substrate layer having a front viewing surface and a rear surface;

b) a plastic substrate layer having a front surface facing said rear surface of said glass substrate and having a rear panel-facing surface for positioning in front of the viewing surface of a plasma display panel;

c) an adhesive layer between said glass substrate layer and said plastic substrate layer;

d) a dye material capable of absorbing infrared energy, said dye material being incorporated into said adhesive layer;

e) an optically selective coating having photopic transmittance, continuous electrical conductivity and reflectivity within the near-infrared region; and f) a grounding element for electrically grounding said optically selective coating.

21. The device described in claim 20 further comprising a first antireflective coating layer formed on the glass substrate layer.

22. The device described in claim 21 further comprising a second antireflective coating layer formed on the plastic substrate layer.

23. A device for positioning in front of the viewing surface of a plasma display panel, said device comprising:

a) at least one plastic substrate layer to provide impact resistance to said plasma display panel;

b) an optically selective coating having photopic transmittance, continuous electrical conductivity and reflectivity within the near-infrared region;

c) a dye material capable of absorbing infrared energy; and d) a grounding element for electrically grounding said optically selective coating.

24. A plasma display panel filter for use with a plasma display panel, said filter comprising:

a) a first transparent substrate having a view side facing away from a plasma display panel with which the plasma display panel filter is to be used, and a panel side to face such a plasma display panel;

b) a first antireflective coating applied to the view side of said first transparent substrate;

c) a second transparent substrate having a view side and a panel side;

d) a second antireflective coating applied to the panel side of said second transparent substrate; and e) a radio frequency interference/infrared shielding coating positioned between the panel side of said first transparent substrate and the view side of said second transparent substrate, said shielding coating having a plurality of layers comprising a combination of at least one dielectric layer and at least one electrically conductive layer adjacent said dielectric layer.

25. A plasma display panel filter for use with a plasma display panel, said filter comprising:

a) a first transparent substrate having a view side facing away from a plasma display panel with which the plasma display panel filter is to be used, and a panel side to face said plasma display panel;

b) a first antireflective coating applied to the view side of said first transparent substrate;

c) a second transparent substrate having a view side and a panel side;

d) a second antireflective coating applied to the panel side of said second transparent substrate;

e) a radio frequency interference/infrared shielding coating positioned between the panel side of said first transparent substrate and the view side of said second transparent substrate, said shielding coating having a plurality of layers comprising a combination of at least one dielectric layer and at least one electrically conductive layer adjacent said dielectric layer;

f) a dye material capable of absorbing infrared energy; and g) at least one plastic substrate layer to provide impact resistance to said plasma display panel.

26. A plasma display panel filter for use with a plasma display panel, said filter comprising:

a) a first transparent substrate having a view side facing away from a plasma display panel with which the plasma display panel filter is to be used, and a panel side to face said plasma display panel;

b) a first antireflective coating applied to the view side of said first transparent substrate;

c) a second transparent substrate having a view side and a panel side;

d) a second antireflective coating applied to the panel side of said second transparent substrate;

e) a radio frequency interference/infrared shielding coating positioned between the panel side of said first transparent substrate and the view side of said second transparent substrate, said shielding coating having a plurality of layers comprising a combination of at least one dielectric layer and at least one electrically conductive layer adjacent said dielectric layer;

f) at least one plastic substrate layer to provide impact resistance to said plasma display panel;

g) a dye material capable of absorbing infrared energy; and h) a grounding element for electrically grounding said shielding coating.

* * * * *